United States Patent [19]
Markson et al.

[11] Patent Number: 5,396,220
[45] Date of Patent: Mar. 7, 1995

[54] STORM WARNING SYSTEM

[75] Inventors: Ralph J. Markson, Weston; Johan A. Govaert, Peabody, both of Mass.

[73] Assignee: Airborne Research Laboratories, Inc., Weston, Mass.

[21] Appl. No.: 776,175

[22] Filed: Oct. 15, 1991

Related U.S. Application Data

[63] Continuation-in-part of Ser. No. 345,720, May 1, 1989, Pat. No. 5,057,820.

[51] Int. Cl.$^6$ .................... G08B 17/12; G01W 1/00
[52] U.S. Cl. ................ 340/600; 73/170.24; 324/72; 340/522; 340/601; 340/691; 340/384.3
[58] Field of Search ........... 340/600, 601, 522, 561, 340/691, 384 E, 329, 384.71, 384.3; 324/72; 73/170 R, 170.24; 250/214 AL; 342/26, 460; 367/93-94

[56] References Cited

U.S. PATENT DOCUMENTS

| | | | |
|---|---|---|---|
| 3,508,259 | 4/1970 | Andrews | 73/170.24 X |
| 3,551,676 | 12/1970 | Runnels | 250/83.3 |
| 3,611,365 | 10/1971 | Lundquist et al. | 340/601 |
| 3,652,981 | 3/1972 | Campanella | 340/961 |
| 3,736,559 | 5/1973 | Trageser | 340/961 |
| 3,754,263 | 8/1973 | Wojtasinski et al. | 343/112 R |
| 3,790,884 | 2/1974 | Kohl | 324/72 |
| 3,846,746 | 11/1974 | Trageser | 340/961 |
| 3,937,951 | 2/1976 | Krider | 250/209 |
| 3,940,607 | 2/1976 | Krider | 250/209 |
| 3,955,192 | 5/1976 | Burt | 340/601 |
| 3,973,258 | 8/1976 | Cerni et al. | 343/5 W |
| 4,023,408 | 5/1977 | Ryan et al. | 73/170 R |
| 4,143,264 | 3/1979 | Gilbert et al. | 250/214 B |
| 4,198,599 | 4/1980 | Krider et al. | 324/72 |
| 4,245,190 | 1/1981 | Krider et al. | 324/72 |
| 4,276,576 | 6/1981 | Uman et al. | 361/1 |
| 4,395,906 | 8/1983 | Ryan et al. | 73/170 R |
| 4,422,037 | 12/1983 | Coleman | 324/72 |
| 4,506,211 | 3/1985 | Coleman | 324/72 |
| 4,527,158 | 7/1985 | Runnels | 340/961 |
| 4,594,543 | 6/1986 | Eriksson et al. | 324/72 |
| 4,672,305 | 6/1987 | Coleman | 324/72 |
| 4,684,951 | 8/1987 | Baumer | 342/362 |
| 4,724,312 | 2/1988 | Snaper | 250/221 |
| 4,801,942 | 1/1989 | Markson et al. | 342/460 |
| 4,803,421 | 2/1989 | Ostrander | 324/72 |
| 4,806,851 | 2/1989 | Krider et al. | 324/72 |
| 4,841,304 | 6/1989 | Richard et al. | 324/72 X |
| 4,897,538 | 1/1990 | Lemaire et al. | 250/214 B |
| 4,901,564 | 2/1990 | Williams et al. | 73/170 R |
| 5,057,820 | 10/1991 | Markson et al. | 340/600 |

OTHER PUBLICATIONS

Vonnegut et al., "Modified Cine Sound Camera for Photographing Thunderstorms and Recording Lightning", Journal of Applied Meteorology, vol. 17, p. 1097, Nov. 1978.

Parker et al., "Airborne Warning Systems for Natural and Aircraft Lightning", IEEE Trans. on Electromagnetic Computability, vol. EMC-24, No. 2, pp. 150-171, May 1982.

Brook et al., "Electric Field Changes and the design of Lightning Flash Counters", Jour. of Geophys. Res., vol. 65, No. 7, Jul. 1960.

MacGorman, D. R.; Burgess, D. W.; Mazur, V.; Rust, W. D.; Taylor, W. L. and Johnson, B. C., "Lightning Rates Relative to Tornadic Storm Evolution on 22 May 1981," reprinted from *Journal of the Atmospheric Sciences*, vol. 46, No. 2, 15 Jan. 1989, pp. 221-248.

*Primary Examiner*—Jeffery A. Hofsass
*Assistant Examiner*—Thomas J. Mullen, Jr.
*Attorney, Agent, or Firm*—Weingarten, Schurgin, Gagnebin & Hayes

[57] ABSTRACT

A lightning and storm warning system capable of distinguishing lightning flashes from other light flashes and indicating to an operator of the existence of a lightning flash even under high ambient illumination conditions. The device may include a visual display indicating the severity and location of the storm and providing an indication of the time progression of the lightning rate.

20 Claims, 14 Drawing Sheets

STORM WARNING SYSTEM

RELATIVE INVENTION

This is a continuation-in-part application of Ser. No. 07/345,720, filed May 1, 1989, which has issued on Oct. 15, 1991, as U.S. Pat. No. 5,057,820.

FIELD OF THE INVENTION

The invention relates to a detection device for thunderstorms and more particularly to a detection device for lightning.

BACKGROUND OF THE INVENTION

Visual lightning detection by the human eye is excellent at night but very poor in daylight. During the day, cloud-to-ground (CG) lightning can be seen against a dark background, but it is difficult to see against a bright background. Further, intracloud (IC) flashes, the best indicators of thunderstorm development, occur 5 to 50 times as frequently as CG flashes, and are almost never seen in daylight. Experience indicates that optical signals from IC lightning are usually detected 10 to 15 minutes before any CG lightning is reported. Thus the ability to detect IC lightning is not only advantageous for monitoring thunderstorm development and intensity, but it can provide earlier warning than systems which only detect CG lightning.

SUMMARY OF THE INVENTION

An embodiment of the invention is an optical sensing system that will detect photoelectric emission from lightning during daylight with as much sensitivity as the eye at night. False alarms, which can occur for a variety of reasons, are substantially eliminated by the addition of a coincidence circuit which requires the coincidence between the optical and either the electrostatic or electromagnetic signal caused by lightning. The circuitry permits the automatic setting of the detection threshold to a level just above that of the noise level generated by background light in the field of view. A rate indicator displays the intensity of the storm as determined by lightning rate.

Another embodiment, by monitoring lightning rate as a function of location, is capable of showing the temporal and spatial variation of storm intensity using a maplike display.

Yet another embodiment utilizes a semi-automatic timing circuit and display to provide an indication of the distance, from the observer, to the storm.

Still yet another embodiment utilizes an optical and/or electrostatic or electromagnetic detector in conjunction with radar to identify the regions of lightning activity and hence storm intensity within the regions of rain displayed by the radar.

DESCRIPTION OF THE PREFERRED EMBODIMENTS

Figure 1:
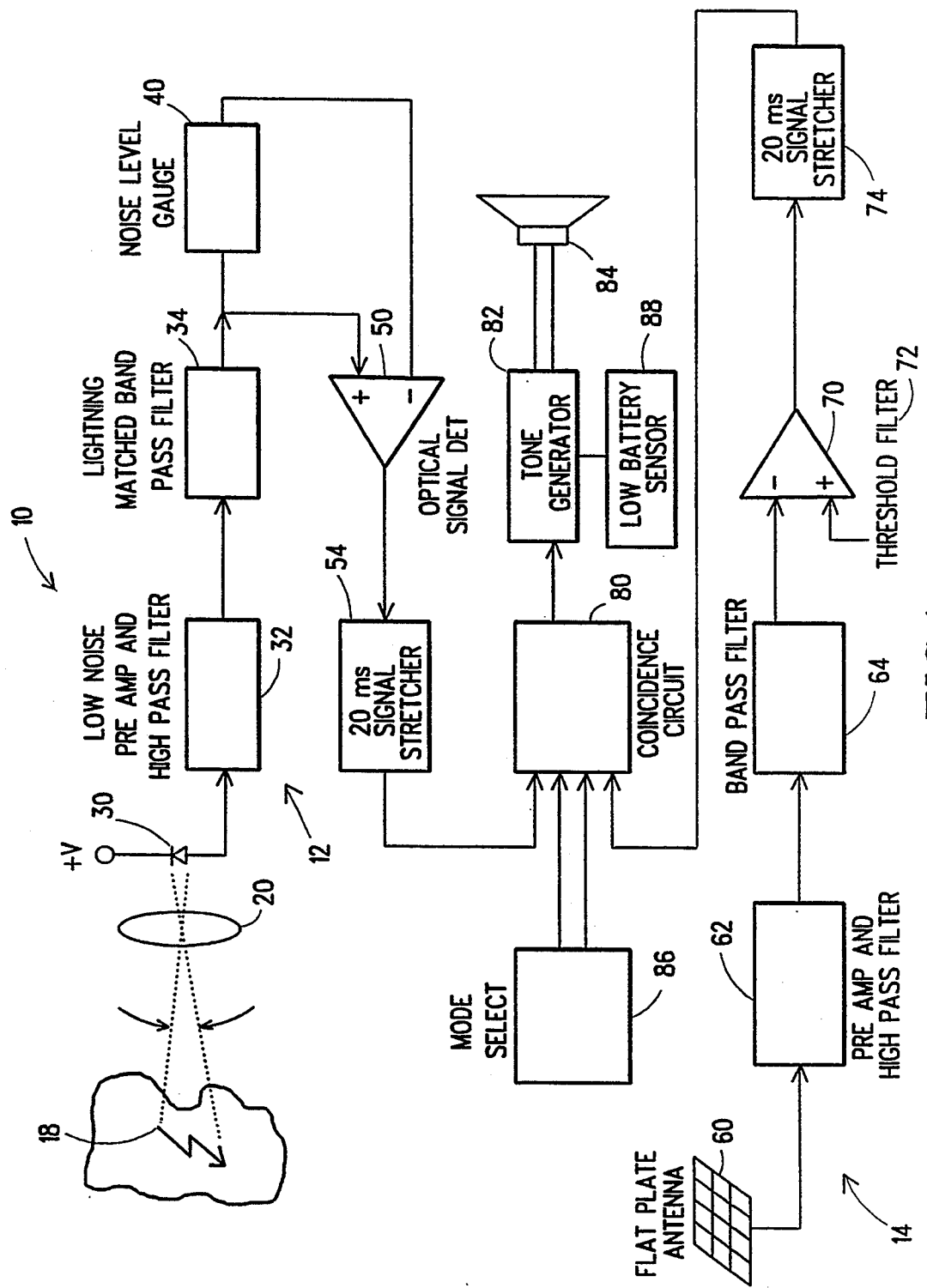
FIG. 1 is a block diagram of an embodiment of the invention utilizing an optical detector and flat-plate antenna and having an audio alarm.

FIG. 1 depicts a block diagram of an embodiment 10 of a storm warning system which can distinguish lightning flashes from other light flashes by detecting the coincidence between the optical flash and the change in the electrostatic field which are both caused by a lightning stroke 18. The device 10 includes an optical section 12 and an electrostatic section 14, which may be used in conjunction or separately.

Considering the optical section 12 first, light from a lightning stroke 18 is focussed by a lens 20 onto the optical detector 30. In this embodiment, in order to obtain the best signal to noise ratio, no optical filter is used. It is contemplated however that an IR optical filter may be used with the detector 30 to filter out stray light, albeit decreasing the signal to noise ratio.

The output signal from the detector 30 is amplified by a low noise pre-amplifier/filter 32 which includes a high-pass filter to prevent slow changes in light intensity, which are characteristic of ambient light, from passing through the filter 32. The output signal of the pre-amplifier/filter 32 is the input signal to a band pass filter 34 which is matched to the temporal properties of the lightning stroke 18. This essentially means that an electrical signal with a rise time of about 25 microseconds will pass through the filter 34. The band pass of filter 34 is from 3.2 to 19 KHz.

The output signal of band pass filter 34 is both the input signal to a noise level measuring circuit 40 and one input signal to an optical signal discriminator 50. The noise level of the optical detector 30 changes within background light level, and although the ambient background light is substantially constant (generating only shot noise in the detector), under some circumstances, it contains a large a.c. component. The noise level measuring circuit 40 generates a threshold level signal related to the average noise. This threshold level signal is the other input signal to the optical signal discriminator 50. Whenever the output signal from the band pass filter 34 exceeds the threshold level generated by the noise level measuring circuit 40, the output signal of the optical signal discriminator 50 will be positive.

Next considering the electrostatic section 14, this embodiment includes a flat plate antenna 60 which is used to measure the electrostatic field. The output signal of the antenna 60 is the input signal to a pre-amplifier and high pass filter 62. The high pass filter 62 again is used to remove the signals which are caused by slow changes in the electrostatic field. The output signal of the high pass filter 62 is the input signal to a band pass filter 64. The band pass filter 64, having a band pass from between 1–40 KHz., is tuned to permit only those signals to pass which have the temporal characteristics corresponding to changes in the electrostatic field caused by lightning.

The output signal of the band pass filter 64 is an input to a threshold comparator 70. The other input signal to the comparator 70 is a voltage signal 72 which is manually set to a level sufficient to prevent spurious electrostatic signals. A varying threshold level is not required. Because the field change signal from the antenna 60 is relatively strong, the pre-amplifier and high pass filter 62 and band pass filter 64 of the electrostatic section 14 are of simpler design than their counterparts in the optical section 12.

The output signal of the optical signal discriminator 50 and the output signal of the threshold level comparator 70 are input signals to signal stretching circuits 54, 74 respectively. The twenty millisecond pulses which are the output signals from each signal stretching circuit 54, 74 are the input signals to a coincidence circuit 80.

The stretching circuits 54, 74 hold the signals (stretch the signals) for twenty milliseconds. The stretching of the signals permits for some variation in overlapping time between the electrostatically generated signal and the optically generated signal necessary for coincidence when the optical 12 and electrostatic 14 sections are used in conjunction. It should be noted that field changes of either polarity can may be stretched by the signal stretching circuit 74. When the optically generated signal and the electrostatically generated signal are present simultaneously, (hence the requirement mentioned previously about stretching the pulse) the coincidence circuit 80 generates a pulse output signal which is the input signal to a tone generator 82. The tone generator 82 generates, by means of a speaker 84, an audible tone, having a duration corresponding to the duration of the stretched signal.

Figure 1A:
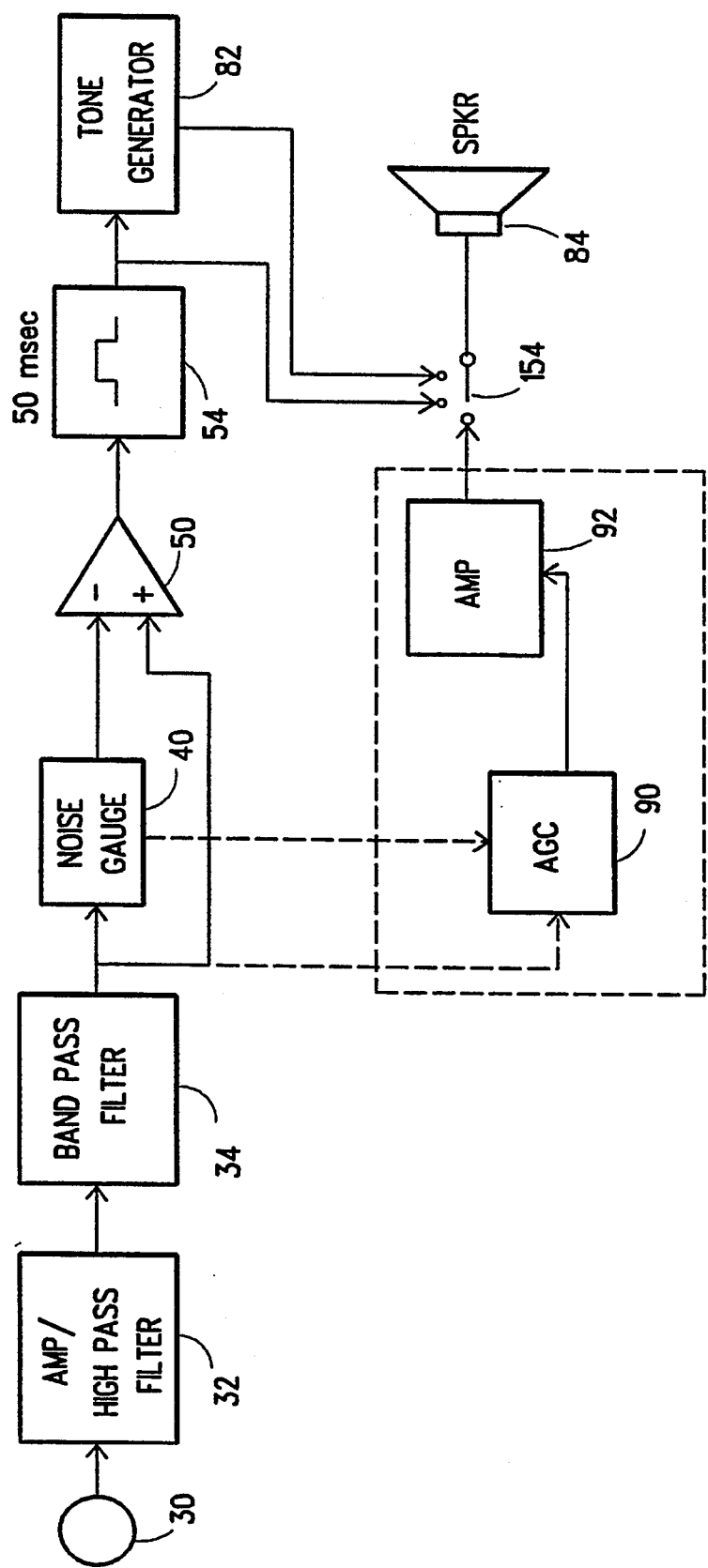
FIG. 1A is a block diagram of the optical portion of the invention of FIG. 1 having a switchable amplified optical or a tone output.

Referring to FIG. 1A, showing only the optical portion of the device, stretching the signals also serves another purpose. By using the stretching circuits 54, 74, to stretch the signal to twenty milliseconds, an audio pulse may be generated which is sufficiently long to be heard easily, but which is short enough so that substantially all of the stroke pulses in each lightning flash can be heard separately. In this way, the staccato sound, which is characteristic of a lightning flash, may be heard by the observer and thereby help the observer to distinguish lightning from other flashes of light when the optical portion of the device is used independently of the electrostatic portion. A switch 154 may be provided so that either a tone or the audio pulse is communicated to the speaker 84. Alternatively, the output signal from the optical detector 30 may be the input signal to an automatic gain control 90 and amplifier 92 (shown in phantom) and used to drive the speaker 84 directly.

Figure 2:
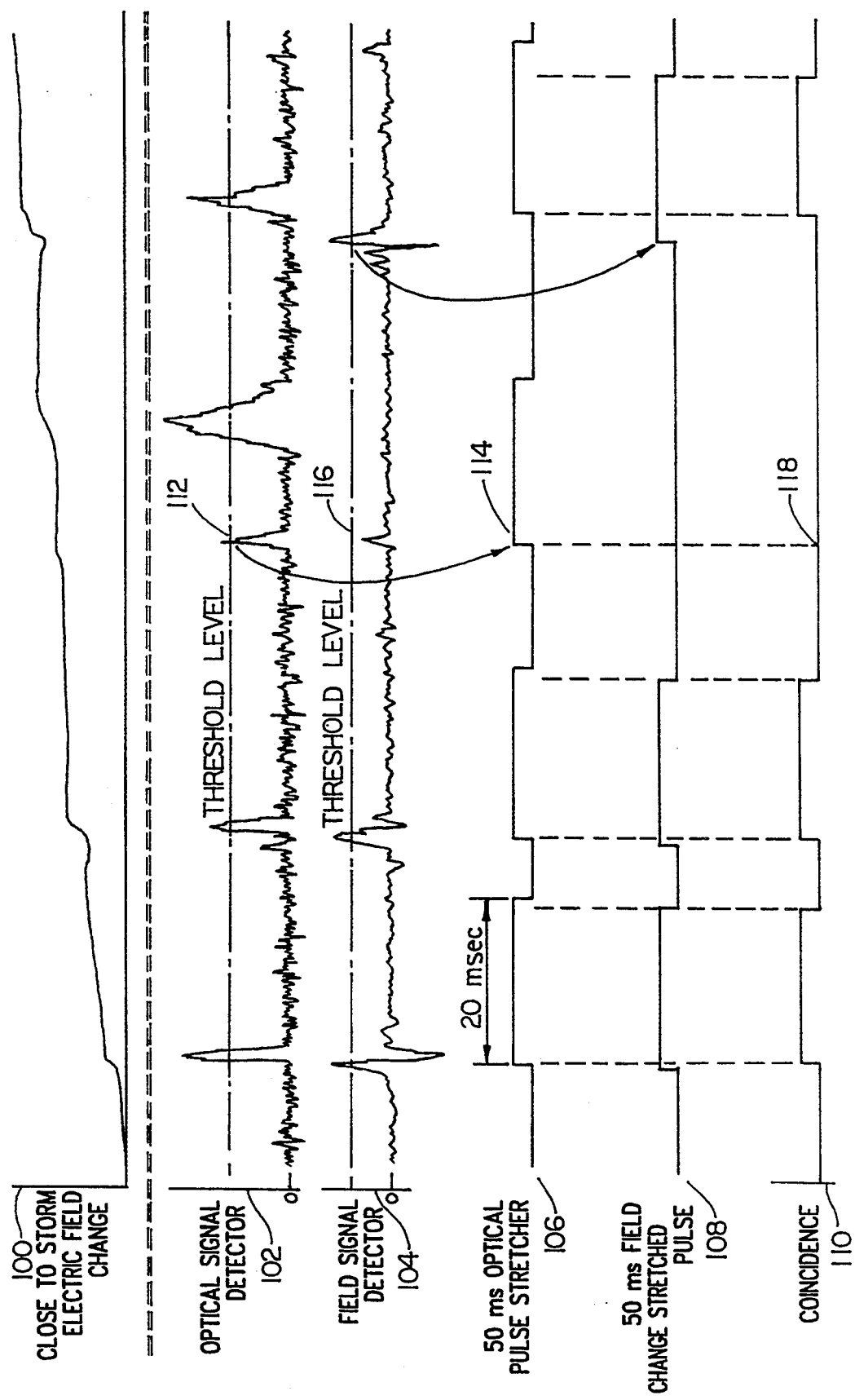
FIG. 2 is a timing diagram of the embodiment of the invention shown in FIG. 1.

FIG. 2 depicts a timing diagram indicating the relationship between the electrostatic field 100 during a thunderstorm, the output signal 102 from the optical band pass filter 34, the output signal 104 from the electrostatic band pass filter 64, the output signal 106 of the optical signal stretching circuit 54, the output signal 108 from the electrostatic signal stretching circuit 74, and the output signal 110 from the coincidence circuit 80. Note that although the optical signal 102 indicates a sufficiently intense light signal 112 to exceed the average noise threshold and generate a stretched output signal 114 from optical signal stretching circuit 54, the threshold level for the electrostatic comparator 70 has been set high enough so that the signal 116 from the band pass filter 64 is insufficient to permit the comparator 70 to generate a signal for the signal stretching circuit 74. The result is that no coincidence pulse is generated 118 and no warning signal is given. This circuitry permits the system to selectively warn of near storms only.

In the embodiment shown, a mode selector switch 86, which is also the power switch, may be used to disable the coincidence circuit 80 and permit, depending upon switch position, the optical signal or the field change signal alone to trigger the tone generator 82. Additionally, the embodiment shown includes a low battery sensor 88. When a low battery voltage is detected, the tone generator 82 is pulsed, approximately every two seconds, to sound an audible warning.

Figure 3:
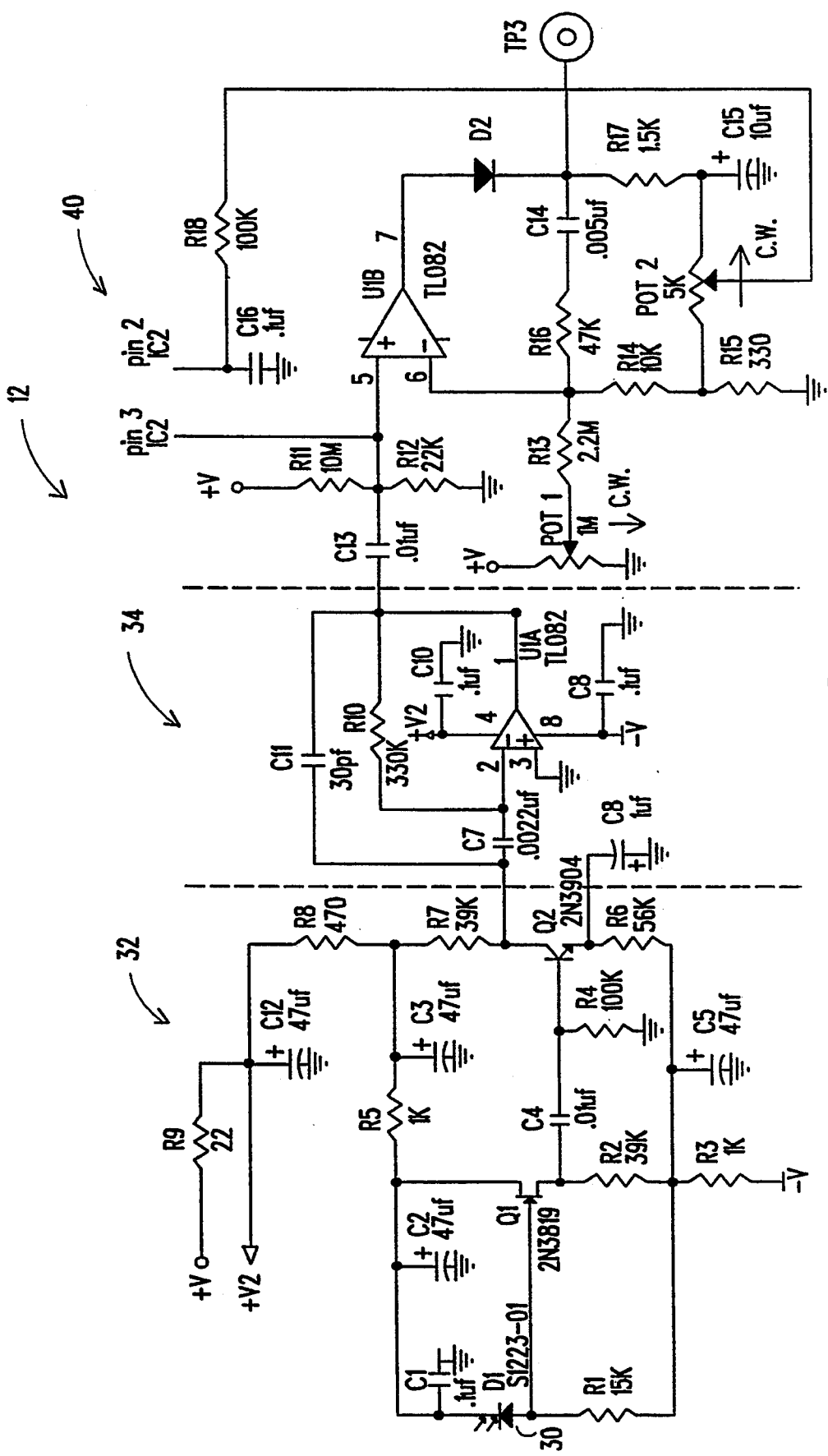
FIGS. 3, 3A, 3B are a schematic diagram of an embodiment of a circuit implementing the functions of the block diagram of FIG. 1.
Figure 3A:
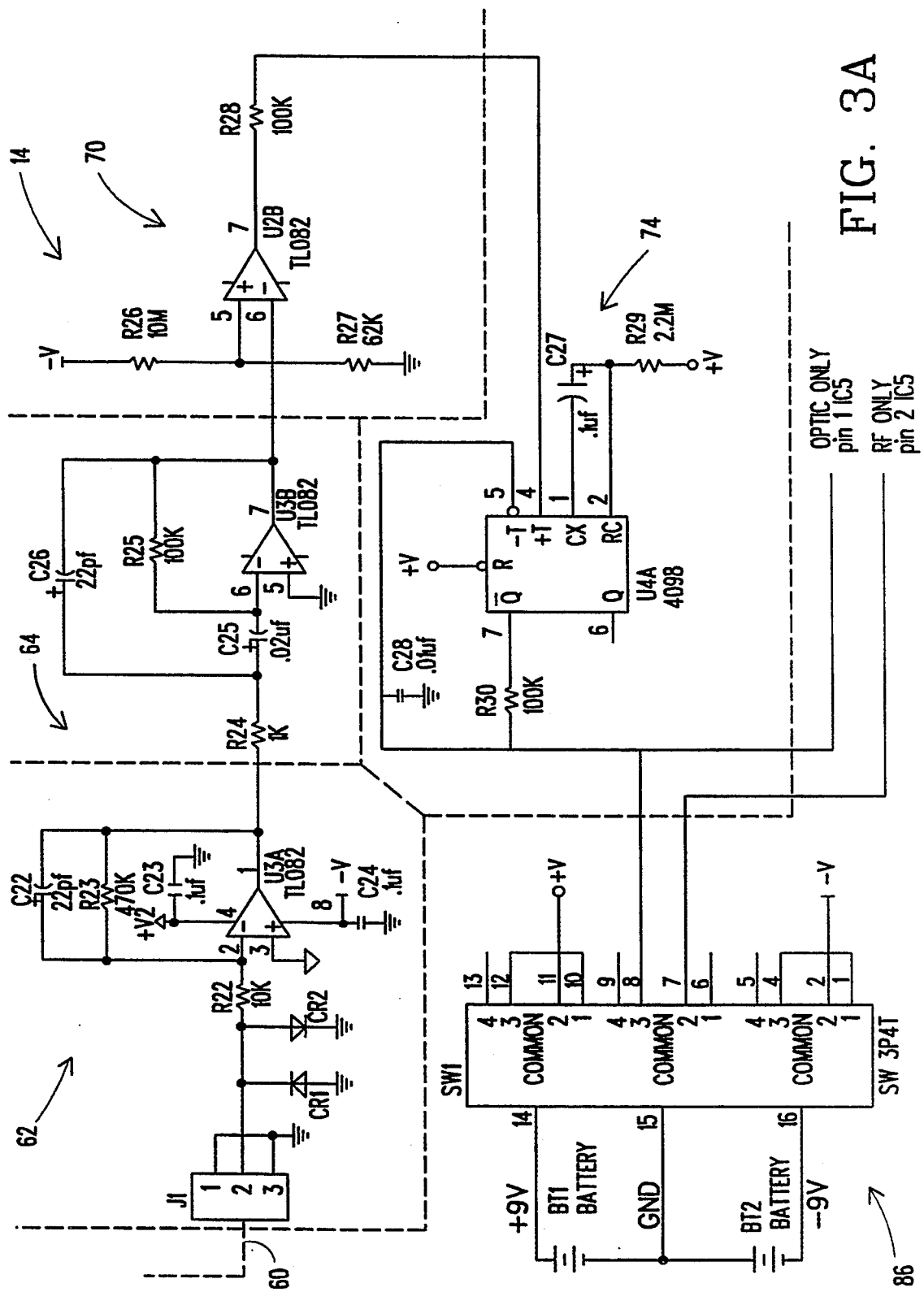
Figure 3B:
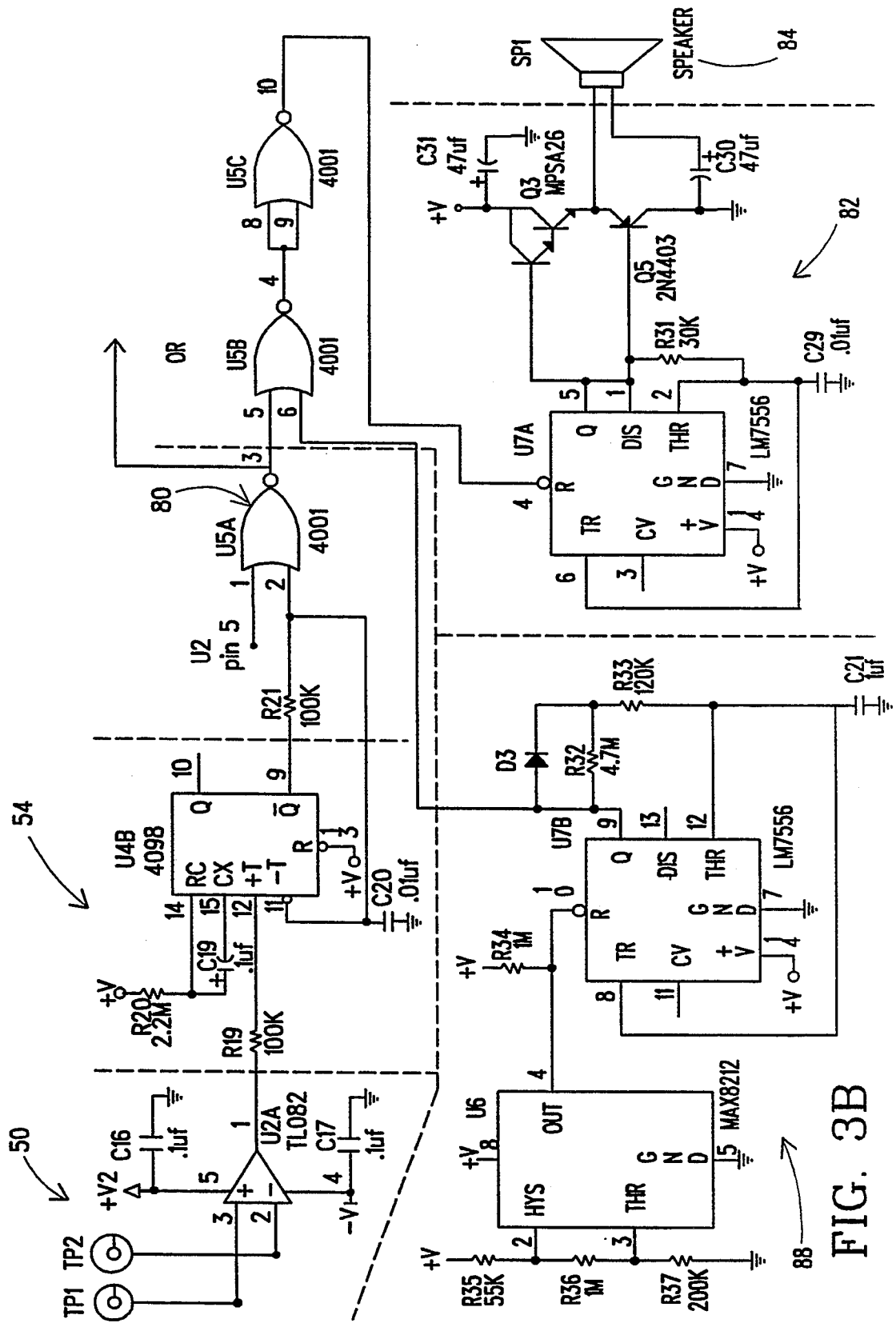

It should be noted that the flat plate antenna and circuitry for monitoring the electrostatic field may be used in conjunction with other embodiments, including those using multiple optical sensors. In such an embodiment, the coincidence circuit 80 is configured to indicate coincidence when changes in the electrostatic field occur simultaneously with signals generated by any of the plurality of optical sensors. FIGS. 3–3B is a schematic diagram of a circuit which performs the functions of the block diagram just discussed.

Figure 4:
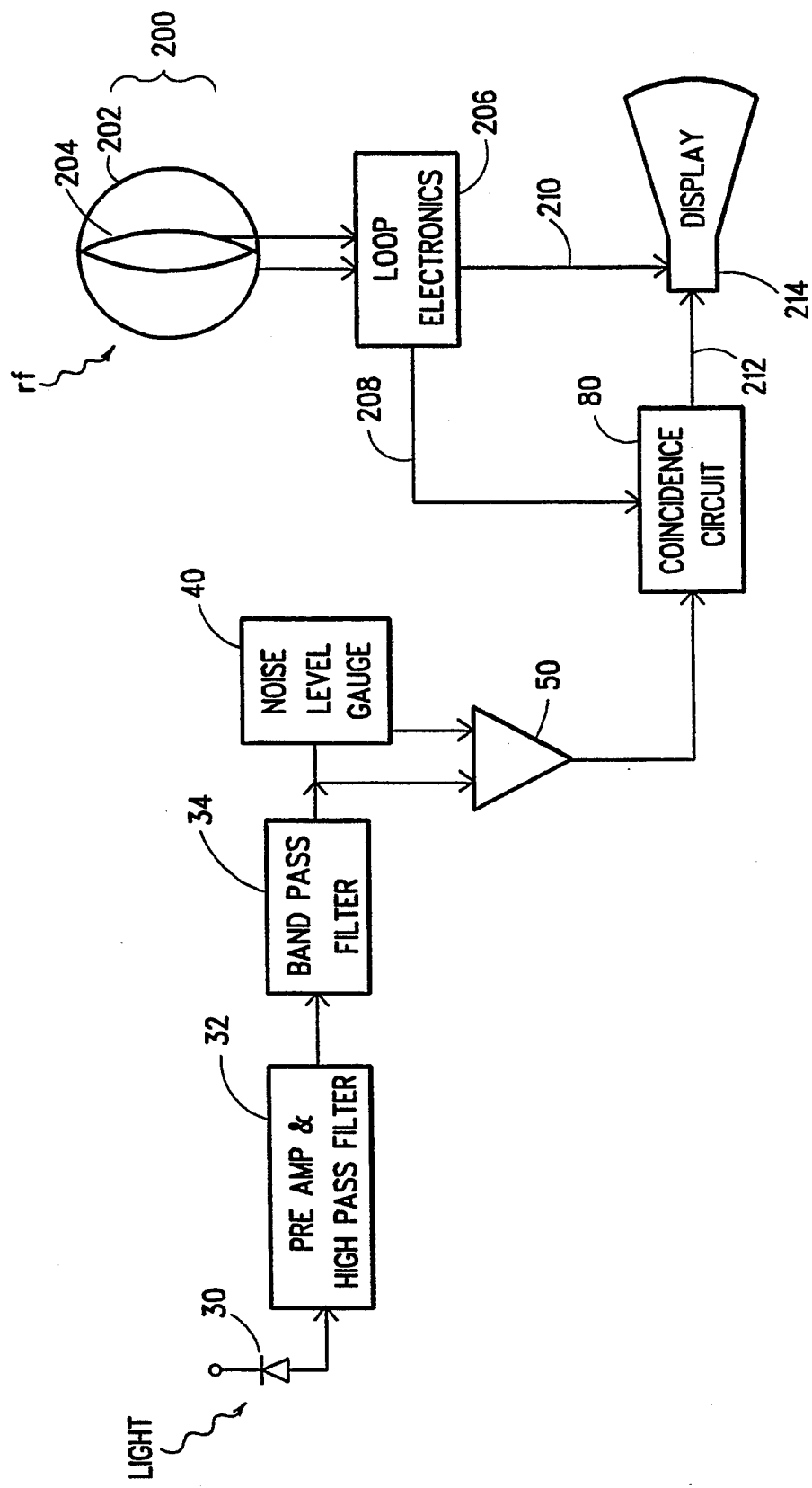
FIG. 4 is a block diagram of an embodiment of the invention using a cross-loop antenna to obtain directional information.

Another embodiment of the invention in which directional information relating to the relative bearing of the lightning stroke is displayed is shown in FIG. 4. The flat plate antenna 60 and related electronics of the previous embodiment is replaced with a system including a cross-loop antenna 200, having two individual loops 202, 204 oriented orthogonally with respect to one another. Each loop 202, 204 receives the rf-signal produced by the lightning stroke and produces an electrical signal which is a function of the orientation of the rf-source, the lightning stroke, with respect to loop 202, 204. The electrical signal produced is strongest when the rf-source is normal to the plane of the loop 202, 204 and is minimum when the rf-source is in the plane of the loop 202, 204. The ratio of the signal strengths for two loops 202, 204 is thus indicative of the direction of the rf-source relative to the orientation of the loops 202, 204.

The electrical signals generated by the loops 202, 204 are the input signals to the loop electronics 206. One output signal 210 of the loop electronics 206 is the input signal to the location display 214. The other output signal 208 of the loop electronics 206 is an input signal to a coincidence circuit 80.

As in the previous embodiment, an optical detector 30 produces an electrical signal upon the detection of light from the lightning stroke. The output signal of the optical detector 30 is the input signal to a preamplifier and high pass filter 32. As explained previously, the high pass filter 32 prevents slow changes in light intensity from passing through the filter 32. The output signal of the high pass filter 32 is the input signal to a band pass filter 34 as previously described. The output signal from the band pass filter 34 is one signal input to a comparator 50.

The output signal of the band pass filter 34 is also the input signal to a noise level gauge 40. As in the previous embodiment the noise level gauge 40 generates an average of the signal noise generated by the detector 30. The average generated by the gauge 40 is the second input to the comparator 50. If the output signal voltage from the band pass filter 34 exceeds the average noise level voltage of the noise level gauge 40, the comparator 50 produces an output signal which is the input signal to the coincidence circuit 80.

If the coincidence circuit 80 detects coincidence between the electrical signals generated by the rf-signal from the lightning and the optical signal from the lightning, an output signal 212 is generated which triggers the display 214 and permits the bearing of the rf-source to be displayed. The requirement of coincidence between the rf-signal and the optical signal insures that only sources, such as lightning, which produce both strong rf-signals and light signals will be displayed.

Alternatively, the display 214 in this embodiment, or the display in any embodiment, may include a voice warning. In this embodiment, the display 214 may contain a processor and a voice synthesizer which audibly recites the bearing of the lightning when the synthesizer is enabled by the output signal 212 of the coincidence circuit 80.

The optical detector may provide an indication of the severity of the thunderstorm wind velocities by the use of an analog or digital rate meter in the display portion of the device. Either the rate of lightning from the optical section 12 or the rate of lightning from the electrostatic section 14 may be selectably displayed. With an additional meter, both rates may be displayed simultaneously.

The more severe a thunderstorm is, the higher the lightning rate. Since the optical section 12 only surveys a small portion of the sky, the lightning rate determined by the optical portion 12 is generally much less that the lightning rate determined by the electrostatic section 14, which is non-directional. As a result, a lightning rate of five to ten flashes per minute, as determined optically, from a single storm cloud, indicates a moderate to severe storm, while a lightning rate of one hundred to more than one thousand flashes per minute, as determined electrostatically, indicates much severe storm activity in the region.

Figure 5:
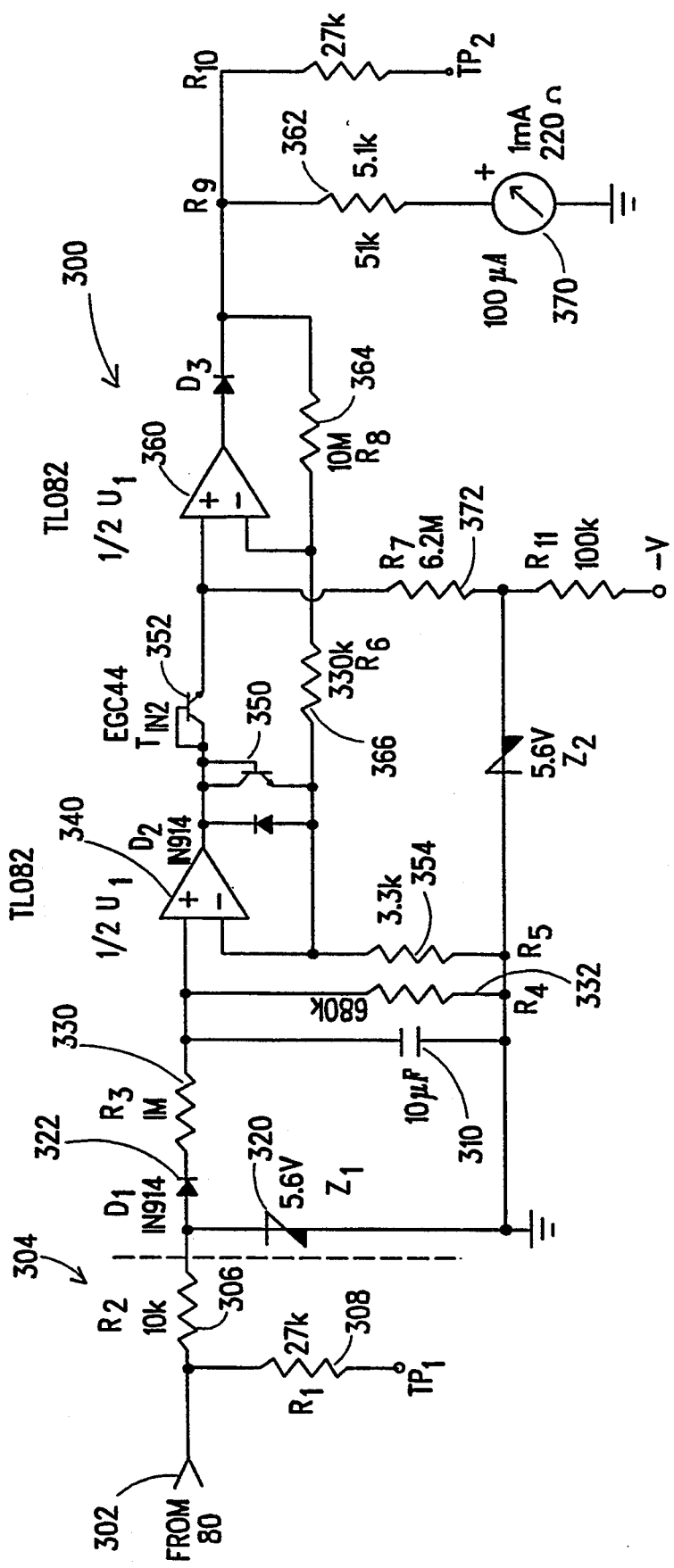
FIG. 5 is a schematic diagram of an embodiment of the invention having a rate meter as a part of the display.

FIG. 5 is a schematic diagram of a rate meter circuit 300. In this circuit, the amount of current through meter 310 is a function of the rate at which pulses enter the circuit 300 from the coincidence circuit 80. Specifically, the twenty msec. output pulse signal from coincidence circuit 80 is the input signal 301 to the rate meter circuit 300 through a current limiting resistor 306 where it is clamped to a 5.6 v pulse by zener diode 320.

This signal charges a capacitor 310 through a voltage divider of resistors 330 and 332. A reverse current diode 322 isolates the voltage divider resistor 330 after the twenty millisecond pulse. The resistor 332 connected across the capacitor 310 therefore defines a time constant for the discharging of the capacitor 310 because the reverse current diode 322 has isolated the voltage divider resistor 330. The amount of charge on the capacitor 310 is a function of the number of pulses being received by the rate meter circuit 300 per unit time.

The voltage on the capacitor 310 is the input signal to one input terminal of an operational amplifier 340. The output signal from the operational amplifier 340 is the input signal to two transistors 350, 352 connected as a voltage follower. As the voltage on the capacitor 310 varies, the operational amplifier 340 maintains a current through resistor 354 which is proportional to the charge on the capacitor 310.

The output signal of one transistor 352 of the voltage follower is the input signal to one input of an inverting amplifier 360. The output from the other transistor 350 of the voltage follower is the input signal to the other input of the inverting amplifier 360. The inverting amplifier 360 is connected as a logarithmic amplifier whose output signal is proportional to the log of the ratio between the quiescent current through resistor 372 and the current caused by the charge on the capacitor 310.

In the embodiment shown, the logarithmic amplifier, with a gain of thirty, is capable of three decades of signal amplification as determined by the value of resistor 362 and the ratio of resistors 364 and 366. The low end of the scale is determined, in part, by the ratio of resistors 330 to 332 and the ratio of resistors 354 and 372. The output of the amplifier 360 is the input signal to a microammeter 370 having one hundred microamps full scale deflection. The reading on the meter is proportional to the log of the number of pulses entering the rate meter circuit 300 per unit time.

Figure 5A:
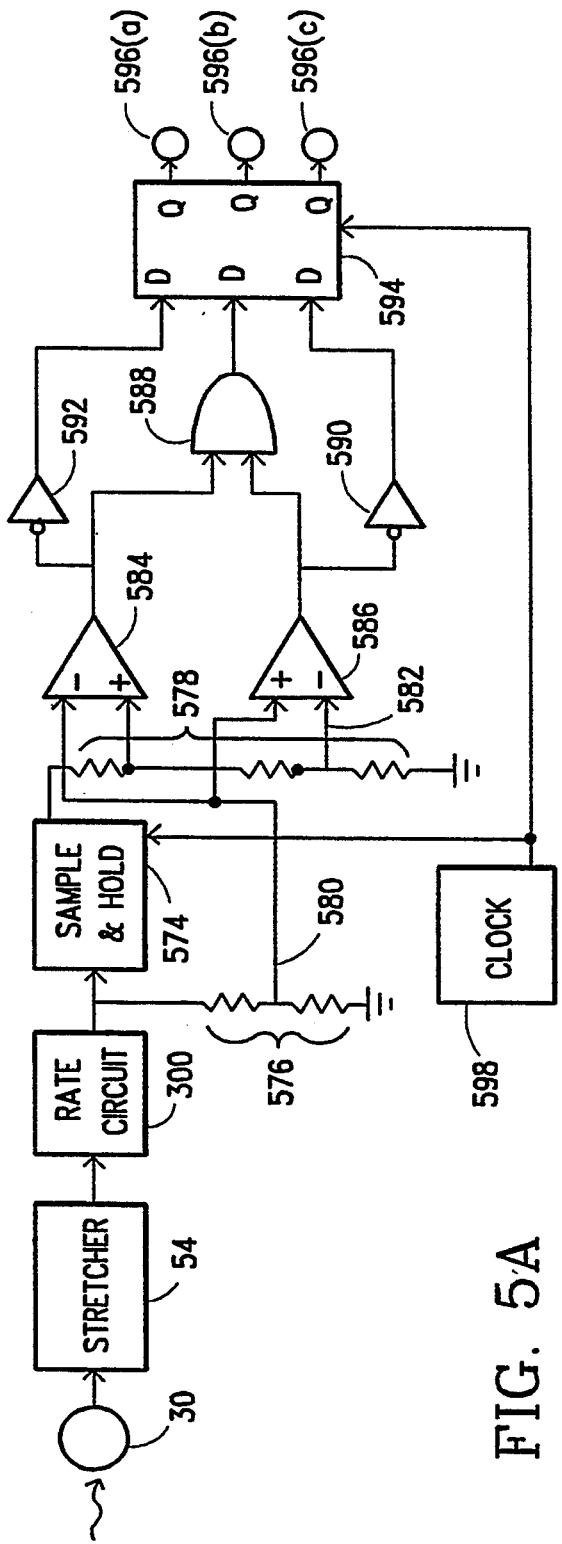
FIG. 5A is a block diagram of an embodiment of a circuit which displays whether the lightning rate is increasing, decreasing or remaining the same.

Additional rate indicators may be included which indicate the change in rate of lightning over various periods of time and hence the change in rate may be determined. These additional indicators may either show the average rate over past time intervals or may simply indicate that the rate is increasing or decreasing. A block diagram of an embodiment of a circuit which displays whether the rate of lightning is increasing, decreasing or remaining the same is shown in FIG. 5A.

The signal from the optical detector 30, or alternatively the electrostatic portion 14 or a combination from both portions, is processed as described previously (shown only as the signal stretching block 54 for simplicity) and communicated to a rate determining circuit 300. The output signal from the rate determining circuit 300 is an input signal to a sample and hold circuit 574 and a voltage divider 576. The output signal from the sample and hold circuit 574 is the input signal to a voltage divider 578. The signal 580, 582 from each voltage divider 576, 578 respectively, are the input signals to two comparators 584, 586. In one comparator 584 the signal from voltage divider 576 is the negative input and in the other comparator 586, it is the positive input. Thus, if the present rate from the rate circuit 300 is less than the previous rate as stored in the sample and hold circuit 574, one comparator 586 will generate a low output signal, while if the present rate is greater than the previous rate, the other comparator 584 will generate a low output signal. If the rate is neither increasing nor decreasing, neither comparator 584, 596 will generate a low output signal and the two high signals will be ANDed together by an AND gate 588. The low output signals from the comparators 584, 586 are inverted by inverters 592, 590, respectively, and are used to drive a three element display 596. The display driver 594 lights the lights 594(a)–594(c) corresponding to the change in rate. A clock 598 drives both the display driver 594 and the sample and hold circuit 574.

Thus, if comparator 584 has a low output indicating an increasing rate, the inverter 592 causes the increasing rate light 596(a) to be lit. Similarly, if comparator 586 has a low output indicating a decreasing rate, inverter 590 will cause the decreasing rate light 596(c) to be lit. If neither comparator 584,586 has a low output, indicating no change in rate, the high signal from the AND gate 588 will cause the no-change light 596(b) to be lit.

Figure 5B:
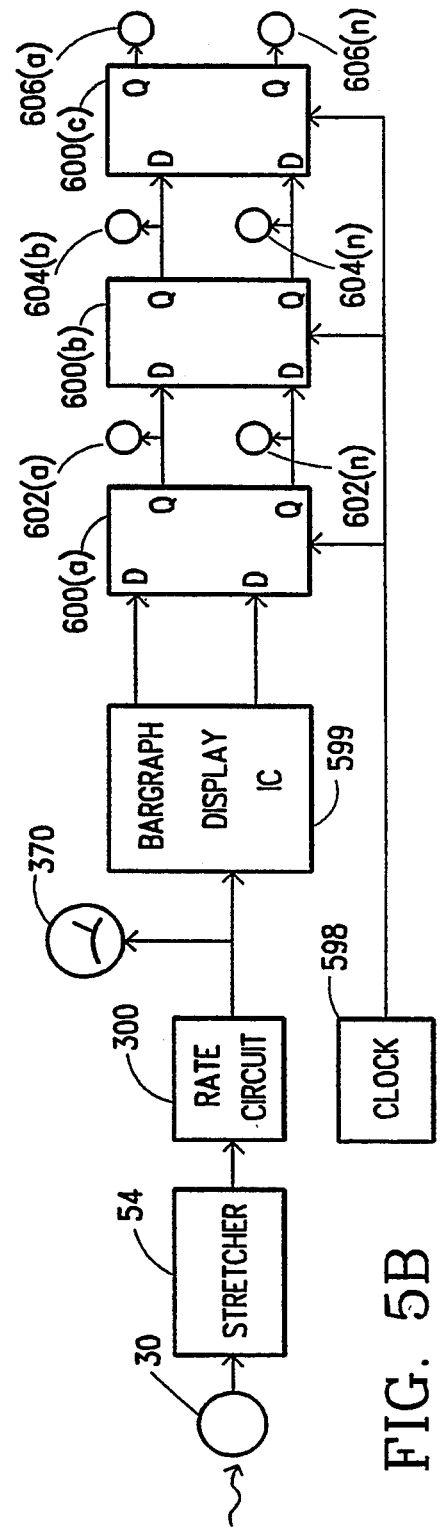
FIG. 5B is a block diagram of an embodiment of a circuit which displays a time history of the lightning rate.

Another embodiment which depicts the time history of the rate is shown in FIG. 5B. The signal from the optical detector 30 is processed as previously discussed but the rate information from the rate circuit 300 is not only displayed on a rate meter 370, but is also the input signal to a bar graph display integrated circuit 599. The output of the bar graph display integrated circuit 599 is an input signal to a group of bar graph drivers 600(a)-600(c) connected in series. The output from each bar graph driver 600(a)-600(c) is used to drive a bar graph display 602, 604, 606 and the next display. Therefore, on each clock cycle from a clock 598, a display driver 600(a) output is shifted into the next display driver 600(b) input. In this manner, the group of bar graphs 602, 604, 606 displays the time history of the lightning rate.

Figure 9:
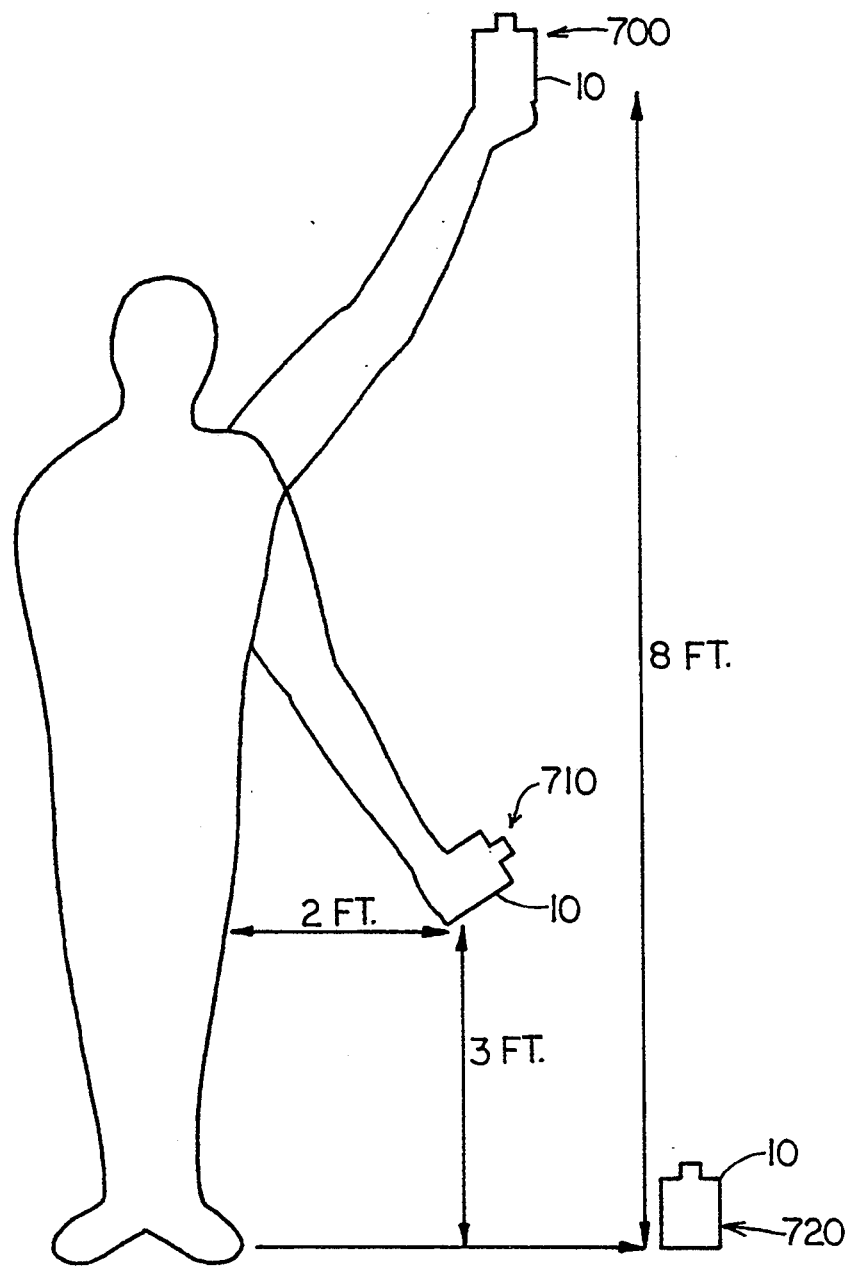
FIG. 9 is a highly schematic representation of the use of the invention to determine distance to a lightning storm.

In addition to storm rate information, the detector may be used to supply a measure of the distance to the storm by placing the detector in electrostatic-mode only (rather than in coincidence mode) and holding the detector at various distances from the ground (FIG. 9). Because the operator of the device is a conductor, the atmospheric electric field lines are deformed in the vicinity of the operator and converge to a greater or lesser degree onto the antenna 60, depending upon the proximity of the antenna 60 to the operator's body. In the embodiment shown, when the detector is held above the head of the operator at a height of approximately eight feet 700, the body of the operator tends to concentrate the field lines onto the plate antenna and effectively increase the size of the antenna, thereby increasing its sensitivity and range. Storms one thousand miles away can be detected in this manner. When the device is held about two feet from the body at a height of about three feet 710, the device senses storms at about two hundred miles, due to the body's interference with the field lines. When the device is placed on the ground away from the operator 720, the device only intercepts field lines converging on the antenna and hence detects storms about twenty to forty miles away. A similar method of providing this information without varying the position of the detector is by adjusting either the gain of the amplifier 62 or the size of the antenna 60. Therefore, for example, if no lightning is detected when the device is held at three feet above the ground, but is detected when held above the head of the operator, the storms are between two hundred and one thousand miles away.

Figure 6:
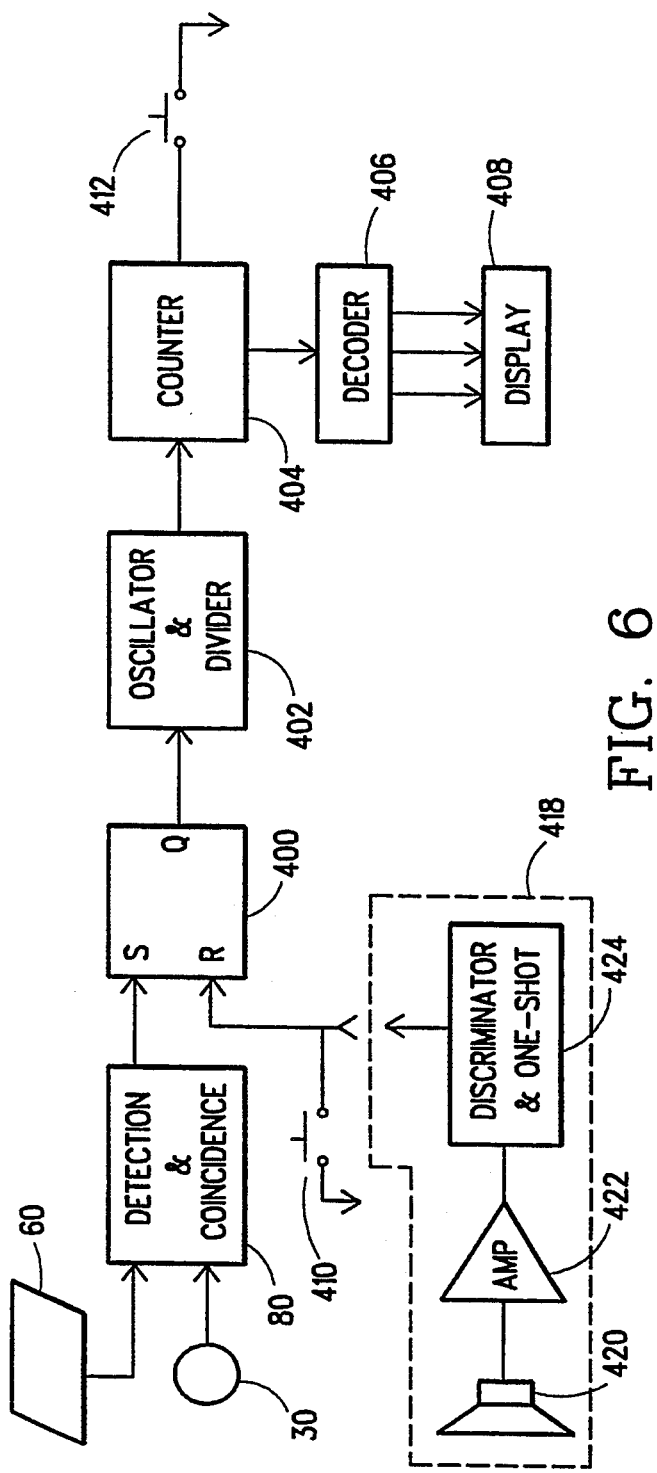
FIG. 6 is a block diagram of a portion of an embodiment of the invention which provides information concerning the distance to a storm.

Still yet another embodiment which provides another means of determining distance to the storm is shown in FIG. 6. In this embodiment, the signal from the coincidence circuit 80 (or alternatively either the signal from the optical 12 or electrostatic 14 section) triggers a flip-flop 400 which starts a combination oscillator and divider circuit 402. The oscillator portion generates a clock signal which measures the time, in seconds, from the triggering event. The time from the triggering event, the flash of lightning, is divided by the divider portion of the circuit to generate a pulse for each 4.8 seconds which is equal to one mile of distance to the flash. Each pulse increments a counter 404 and the value on the counter is decoded by a decoder circuit 406 and displayed by a display 408. When thunder is heard, the operator pushes button 410 resetting the flip-flop 400 and thereby stopping the counter 404. The distance to the storm is then read on the display 408. The operator then resets the counter 404 to zero using a second switch 412 and the distance can be measured again.

An alternative circuit 418 may be used to reset the flip-flop 400 once lightning is heard. Rather than have the operator push the button 410, a microphone 420 detects the thunder and generates a signal which is amplified by amplifier 422. The signal from the amplifier is passed through a discriminator portion of a discriminator and one-shot circuit 424 so as to pass only those sounds corresponding to thunder. The signal which passes the discriminator triggers the one-shot portion of the circuit 424 and resets the flip-flop 400 stopping the counter 404.

Figure 6A:
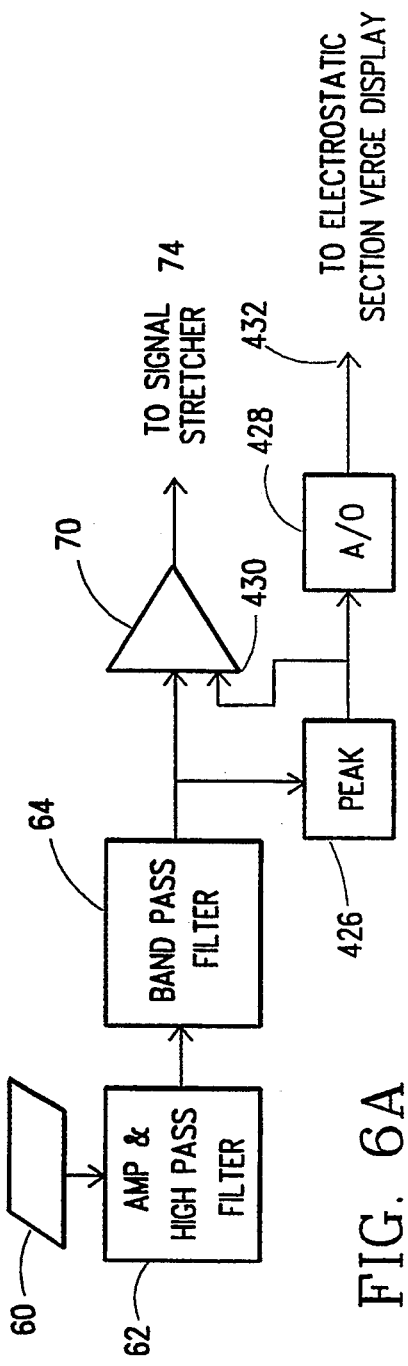
FIG. 6A is a block diagram of another embodiment of a circuit which provides information concerning distance to a storm.

Another embodiment of a portion of a circuit which may be used to provide distance information is shown in FIG. 6A. In this circuit, similar to those previously discussed, the signal from the band pass filter 64 is the input signal to a threshold comparator 70 and to a peak detector 426. Since the peak signal from a storm increases as the storm approaches, a measure of the peak signal permits the storm's movement to be followed. The peak signal may be converted by an A/D converter 428 and displayed on a digital range display 432 to provide an indication of range. Additionally, the output signal from the peak detector 426 may be an input signal 430 to the threshold comparator 70 so as to shift the threshold level and permit only the nearest storm signals to be detected.

Combining the storm warning detector with RADAR provides another method of measuring distance and direction to the storm while simultaneously providing intensity information. In such a system a CRT display may be used to provide location and storm intensity information to the user on a single screen. Alternatively different types of displays may be used for the RADAR and intensity information.

Figure 7:
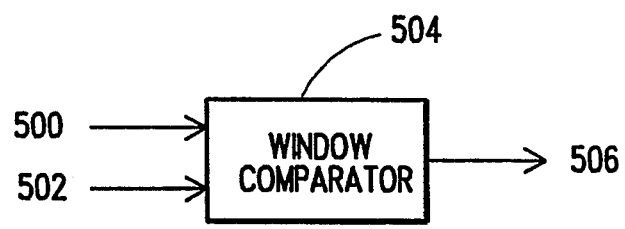
FIG. 7 is a block diagram of a portion of a combination RADAR and optical/electrostatic display circuit.
Figure 7A:
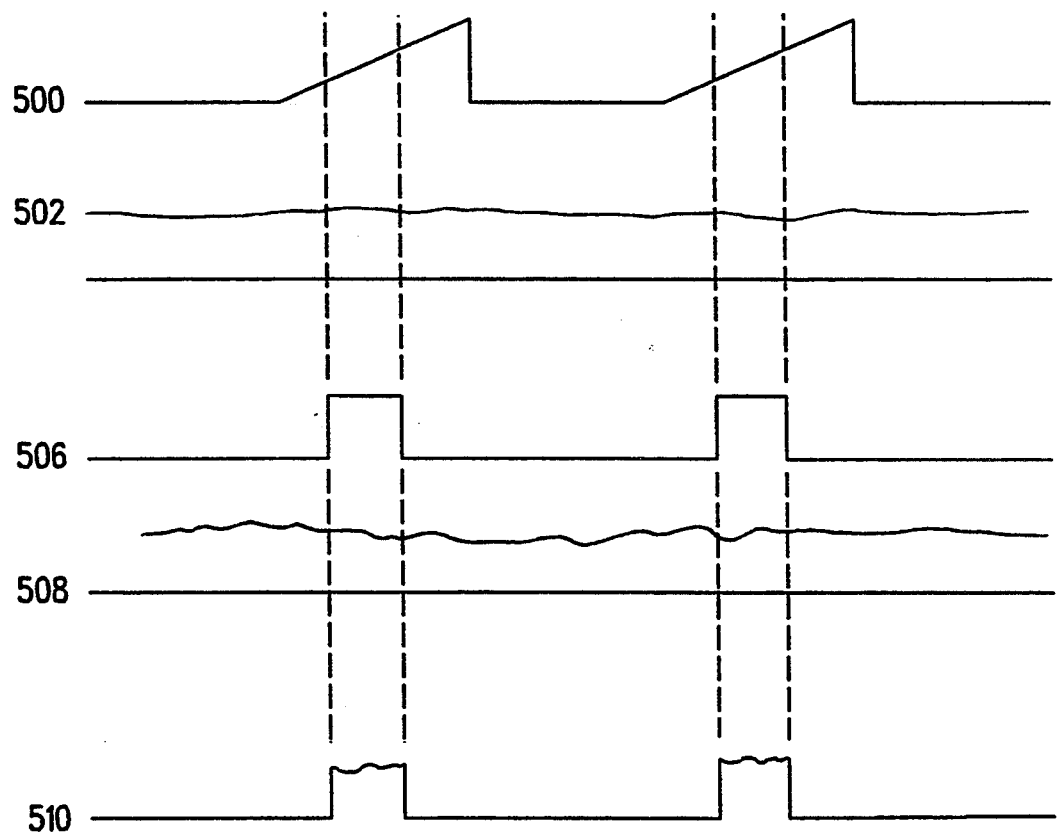
FIG. 7A is a graphical depiction of the various signals used in the combination RADAR and optical/electrostatic display circuit of FIG. 7.

Referring to FIG. 7, a circuit for placing intensity information on the same display as the RADAR includes a window comparator 504, whose input signals are a ramp voltage signal 500 used to drive the CRT beam from the center of the screen to the edge, and a range signal 502 from the electrostatic measurement circuit. The output signal 506 of the comparator 504 determines the region along the radius of the beam sweep which corresponds to the location of the storm activity. By combining this signal 506 with the reflected echo signal 508, the resulting signal 510 determines where the CRT beam will show intensification due to lightning during its radial sweep. Alternatively, the both the RADAR information and the lightning rate information may be signal processed and displayed graphically whereby the storm intensity information is displayed as a different color or symbol on a RADAR-like map display.

Figure 8:
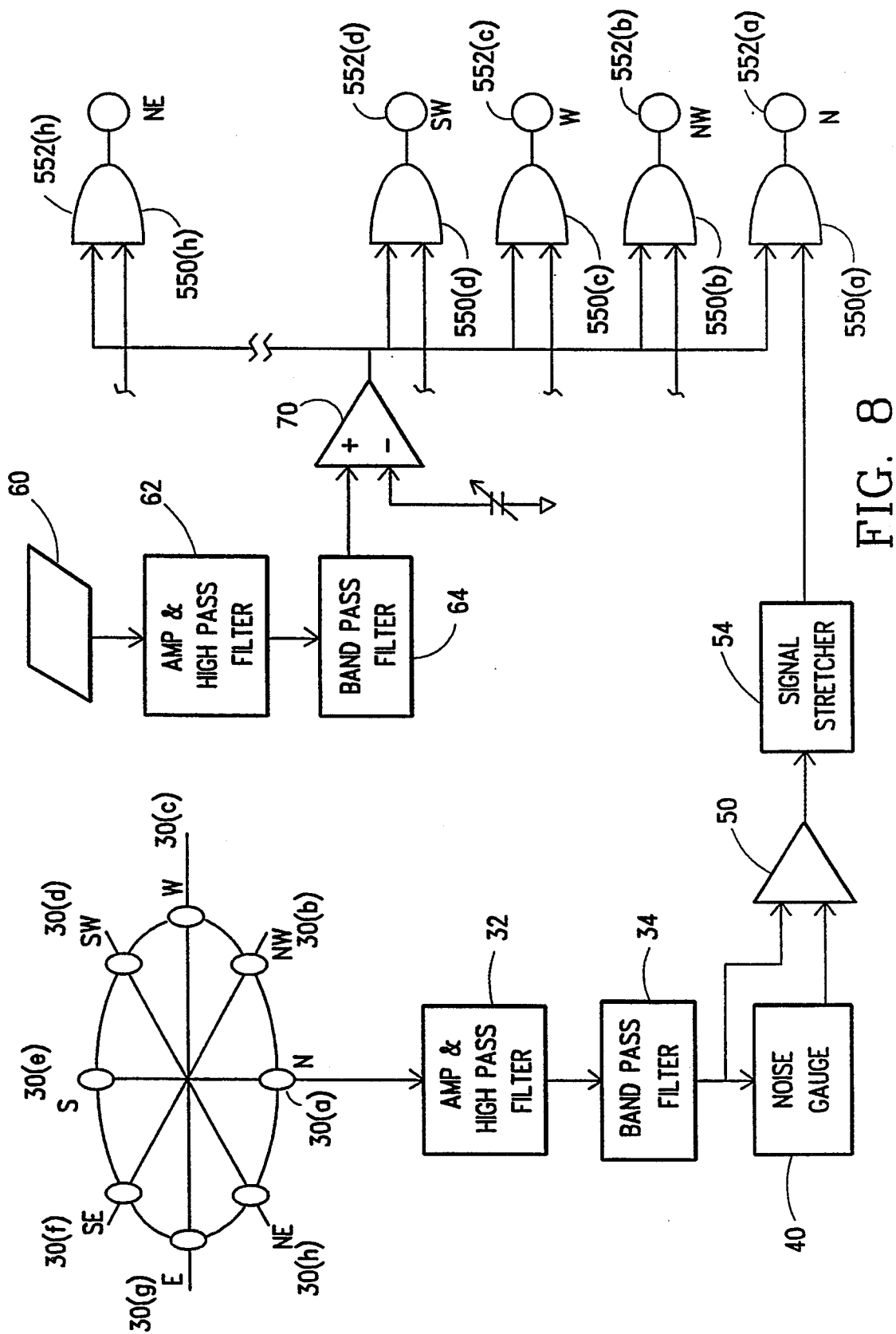
FIG. 8 is a block diagram of an embodiment of the invention having multiple detectors.

Referring to FIG. 8, an embodiment of the invention which provides storm direction information includes a plurality of optical sensors 30(a)-30(h) each pointing in a respective direction and viewing approximately forty five degrees of sky. The signal from each sensor 30 is processed as described previously by its respective amplifier and high pass filter 32, band pass filter 34, noise gauge 40, signal threshold 50 and signal stretcher 54. Only one such processing chain is shown for clarity. The signal from the single antenna 60 is likewise processed by its amplifier and high pass filter 62, band pass filter 64, signal threshold 70. The signals from the optical detectors 30 and the electrostatic antenna 60 are ANDed by a series of AND gates 550(a)-550(h) and the output of each AND gate is used to drive a respective display light 552(a)-552(h). Thus when, for example, optical detector 30(a) detects light from lightning, the signal from the antenna 60 is ANDed with the signal from the detector 30(a) and the light 552(a) is lit, indicating the direction which the detector 30(a) is viewing the lightning.

Figure 8A:
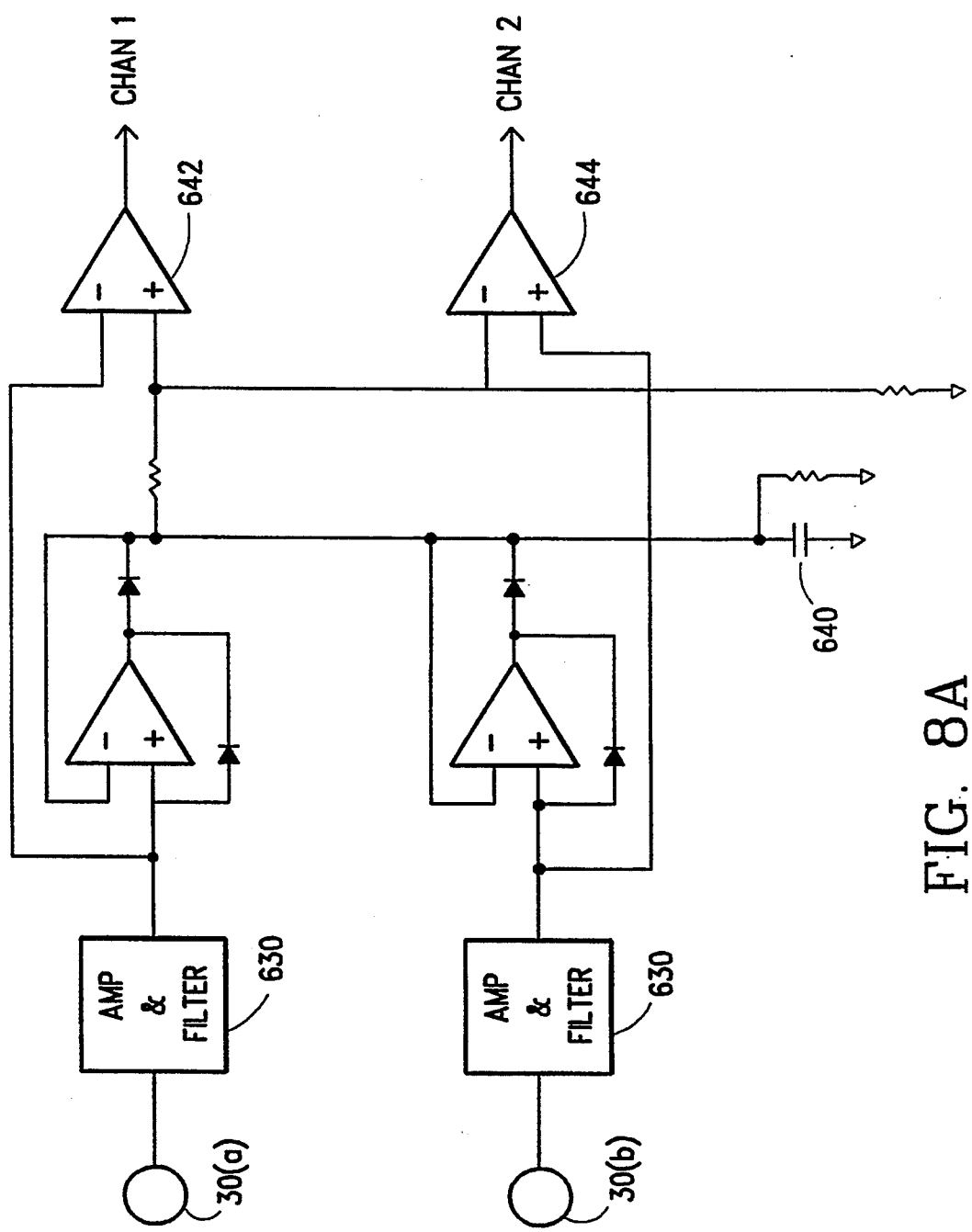
FIG. 8A is a block diagram of a circuit to determine which of the multiple detectors is receiving the strongest signal.

Since lightning is reflected by clouds, it is possible that more than one detector 30 will detect light from a single flash. FIG. 8A discloses a circuit, showing only two detectors for clarity, which determines which detector 30 experiences the strongest signal, hence which is pointed in the direction of the lightning flash. Signals from the detectors 30(a) and 30(b) are amplified and filtered by amplifier filter 630 and then used to charge capacitor 640. The signal from each amplifiers filter 630 is also the input signal to a respective comparator 642, 644. The other input signal to the comparator 642, 644 is the voltage from the capacitor 640. Thus only the strongest signal will both charge the capacitor 640 and pass through the comparator 642, 644 after being compared to the voltage on the capacitor 640. Hence, only the strongest signal will be displayed.

Having shown the preferred embodiments, those skilled in the art will realize many variations are possible which will still be within the scope and spirit of the claimed invention. Therefore, it is the intention to limit the invention only as indicated by the scope of the claims.

What is claimed is:

1. A lightning detection system comprising:
   an optical detection device comprising an output terminal and producing on said output terminal of said optical detection device a first electrical signal in response to the detection of light;
   an electrostatic detection device comprising an output terminal and producing a second electrical signal on said output terminal of said electrostatic detection device in response to changes to the electrostatic field of the earth;
   a coincidence circuit, comprising a first input terminal, a second input terminal and an output terminal, said first input terminal in electrical communication with said output terminal of said optical detection device and said second input terminal in electrical communication with said output terminal of said electrostatic detection device, said coincidence circuit producing a coincidence signal on said output terminal of said coincidence circuit in response to approximately simultaneous presence of said first electrical signal and said second electrical signal at said first and second input terminals of said coincidence circuit, respectively;
   a rate determination circuit comprising an input terminal and an output terminal, said input terminal of said rate determination circuit in electrical communication with said output terminal of said coincidence circuit, said rate determination circuit determining a rate of lightning activity in response to said coincidence signal from said coincidence circuit and producing on said output terminal of said rate determination circuit a rate signal indicative of said rate of lightning activity; and
   a rate display comprising an input terminal, said input terminal of said rate display in electrical communication with said output terminal of said rate determination circuit, said rate display displaying said rate of lightning activity in response to said rate signal.

2. The lightning detection system of claim 1 wherein said rate display comprises:
   a sample and hold circuit comprising an input terminal, an output terminal, and a hold terminal, said input terminal of said sample and hold circuit in electrical communication with said output terminal of said rate circuit;
   a clock comprising an output terminal in electrical communication with said hold terminal of said sample and hold circuit, said clock generating periodic clock signals on said output terminal of said clock, said sample and hold circuit retaining a hold signal value on said output terminal of said sample and hold circuit corresponding to the value of said rate signal on said input terminal of said sample and hold circuit in response to said periodic clock signals on said hold terminal of said sample and hold circuit;
   a first comparator comprising a first input terminal, a second input terminal, and an output terminal, said first input terminal of said first comparator in electrical communication with said output terminal of said sample and hold circuit, said second input terminal of said first comparator in electrical communication with said output terminal of said rate circuit, said first comparator producing, on said output terminal of said first comparator, a first comparator output signal value of a first predetermined value if the value of said rate signal from said rate circuit is greater than the value of said hold signal from said sample and hold circuit;
   a second comparator comprising a first input terminal, a second input terminal, and an output terminal, said first input terminal of said second comparator in electrical communication with said output terminal of said sample and hold circuit, said second input terminal of said second comparator in electrical communication with said output terminal of said rate circuit, said second comparator producing, on said output terminal of said second comparator, a second comparator output signal value which is of said first predetermined value if the value of said rate signal from said rate circuit is less than the value of said hold signal from said sample and hold circuit;
   a decoder circuit comprising a first input terminal, a second input terminal, a trigger terminal, a first output terminal, a second output terminal, and a third output terminal, said first input terminal of said decoder circuit in electrical communication with said output terminal of said first comparator, said second input terminal of said decoder circuit in electrical communication with said output terminal of said second comparator, and said trigger terminal in electrical communication with said clock output terminal;
   a first indicator light in electrical communication with said first output terminal of said decoder circuit;

a second indicator light in electrical communication with said second output terminal of said decoder circuit; and a third indicator light in electrical communication with said third output terminal of said decoder circuit, said decoder circuit, in response to said periodic clock signals from said clock, causing said first indicator light to be energized if the value of said rate signal is less than the value of said hold signal, causing said second indicator light to be energized if the value of said rate signal is equal to the value of said hold signal, and causing said third indicator light to be energized if the value of said rate signal is greater than the value of said hold signal.

3. The lightning detection system of claim 1 wherein said rate display comprises:

a clock comprising an output terminal, said clock generating periodic clock signals on said output terminal of said clock;

a bargraph display circuit comprising at least one input terminal and at least one output terminal;

a plurality of bargraph display drivers each comprising a clock terminal, at least one input terminal and at least one output terminal, said clock terminal of each of said plurality of bargraph display drivers in electrical communication with said output terminal of said clock, said at least one input terminal of a first one of said plurality of bargraph display drivers in electrical communication with a respective said at least one output terminal of said bargraph display circuit, said at least one input terminal of each of said other ones of said plurality of bargraph display drivers in communication with a respective said at least one output terminal of another of said plurality of bargraph display drivers; and a plurality of bargraph displays, each respective one of said bargraph displays comprising an input terminal in electrical communication with said at least one output terminal of a respective one of said plurality of bargraph display drivers, said rate signal being displayed by one of said plurality of display drivers upon each clock signal.

4. Method of determining the distance from a lightning storm to an operator of a lightning detection system, comprising the steps of:

providing said lightning detection system comprising:

an electrostatic detection device producing an electrical signal in response to changes to the electrostatic field of the earth caused by lightning; and a display unit for receiving a signal indicative of the production of said electrical signal by said electrostatic detection device and displaying an indication that said electrical signal has been produced by said electrostatic detection device;

holding said lightning detection system above the head of said operator at a height of approximately eight feet above the ground and determining the presence of said electrical signal from said electrostatic detection device;

holding said lightning detection system about two feet from the body of said operator at a height of about three feet and determining the presence of said electrical signal from said electrostatic detection device;

placing said lightning detection system on the ground away from said operator and determining the presence of said electrical signal from said electrostatic detection device;

determining that said lightning is more than two hundred miles away if said electrical signal is present with said lightning detection system at said height of approximately eight feet but not with said lightning detection system at said height of about three feet, and determining that said lightning is more than forty miles away if said electrical signal is present with said lightning detection system at said height of approximately three feet but not with said lightning detection system on said ground.

5. An optical lightning detection system comprising:

an optical detection device comprising an output terminal and producing an electrical signal on said output terminal in response to the detection of light from lightning activity;

a bandpass filter comprising an output terminal and an input terminal in electrical communication with said output terminal of said optical detection device, said bandpass filter allowing only signals within a predetermined frequency bandwidth to pass from said bandpass filter input terminal to said bandpass filter output terminal;

a signal stretching circuit comprising an output terminal and an input terminal in electrical communication with said output terminal of said bandpass filter, said signal stretching circuit increasing the duration of signals communicated to said signal stretching circuit input terminal and placing said stretched signals on said signal stretching circuit output terminal; and an audio circuit comprising an input terminal in electrical communication with said signal stretching circuit output terminal, said audio circuit producing an audible indication of lightning activity.

6. The optical lightning detection system of claim 5 wherein said audio circuit comprises a tone generator comprising an input terminal in electrical communication with said signal stretching circuit output terminal and an output terminal in communication with a speaker, said tone generator generating a tone in response to said stretched signals from said signal stretching circuit.

7. An optical lightning detection system comprising:

an optical detection device comprising an output terminal and producing an electrical signal on said output terminal in response to the detection of light from lightning activity;

a bandpass filter comprising an output terminal and an input terminal in electrical communication with said output terminal of said optical detection device, said bandpass filter allowing only signals within a predetermined frequency bandwidth to pass from said bandpass filter input terminal to said bandpass filter output terminal; and an audio circuit comprising an input terminal in electrical communication with said output terminal of said bandpass filter, said audio circuit producing an audible staccato sound comprising distinct parts, each of said distinct parts of said staccato sound corresponding to a respective individual lightning stroke, when said optical detection device detects lightning.

8. The optical lightning detection system of claim 7 further comprising a noise gauge comprising an output terminal and an input terminal in electrical communication with said output terminal of said bandpass filter, said noise gauge producing a signal indicative of the amount of background noise in said signals from said bandpass filter on said output terminal of said noise gauge, and wherein said audio circuit comprises:
an automatic gain control circuit comprising an input terminal, a control terminal, and an output terminal, said input terminal of said automatic gain control circuit in electrical communication with said output terminal of said bandpass filter and said control terminal in electrical communication with said output terminal of said noise gauge, said automatic gain control circuit adjusting the strength of the signal from said output terminal of said bandpass filter and producing an adjusted strength signal on said automatic gain control circuit output terminal; and an amplifier comprising an input terminal in electrical communication with said automatic gain control circuit output terminal and an output terminal in communication with a speaker, said audio circuit producing, in response to said adjusted strength signal, an audible staccato sound when said optical detection device detects lightning activity, said staccato sound indicative of lightning activity.

9. An optical lightning detection system comprising:
an optical detection circuit comprising an output terminal and producing an electrical signal on said output terminal in response to the detection of light;
a directional antenna circuit responsive to an electrostatic field indicative of lightning comprising an output terminal and producing directional signals indicating the location of said lightning, said directional signals being produced on said output terminal of said directional antenna circuit in response to lightning activity;
a location display circuit comprising an input terminal and a control terminal, said input terminal in electrical communication with said output terminal of said directional antenna circuit; and
a coincidence circuit, comprising a first input terminal, a second input terminal and an output terminal, said first input terminal of said coincidence circuit in electrical communication with said output terminal of said optical detection circuit and said second input terminal of said coincidence circuit in electrical communication with said output terminal of said directional antenna circuit, said coincidence circuit producing a coincidence output signal on said output terminal of said coincidence circuit in response to approximately simultaneous presence of said electrical signal from said output terminal of said optical detection circuit and said directional signals from said output terminal of said directional antenna circuit at said first and second input terminals of said coincidence circuit, respectively, said output terminal of said coincidence circuit in electrical communication with said control terminal of said location display circuit, said location display circuit displaying, in response to said coincidence output signal from said coincidence circuit and said directional signals from said directional antenna circuit, a representation of the location of lightning activity.

10. The optical lightning detection system of claim 9 wherein said directional antenna circuit comprises a cross-loop antenna in electrical communication with a cross-loop antenna circuit.

11. The optical lightning detection system of claim 9 wherein said location display circuit is an optical display unit providing a visual representation of the location of lightning activity.

12. The optical lightning detection system of claim 9 wherein said location display circuit comprises a microprocessor and audio circuit providing an audio representation of the location of lightning activity.

13. The optical lightning detection system of claim 12 wherein said audio circuit provides a synthesized voice representation of the location of lightning activity.

14. A lightning detection system comprising:
an optical detection device comprising an output terminal and producing on said output terminal a first electrical signal in response to the detection of light;
an electro-detection device comprising an output terminal and producing a second electrical signal on said output terminal of said electro-detection device in response to electrical disturbances caused by lightning;
a coincidence circuit, comprising a first input terminal, a second input terminal and an output terminal, said first input terminal in electrical communication with said output terminal of said optical detection device and said second input terminal in electrical communication with said output terminal of said electro-detection device, said coincidence circuit producing a coincidence signal on said output terminal of said coincidence circuit in response to approximately simultaneous presence of said first electrical signal and said second electrical signal at said first and second input terminals of said coincidence circuit, respectively;
a flip-flop comprising a set terminal, a reset terminal and an output terminal, said set terminal in electrical communication with said output terminal of said coincidence circuit, said flip-flop producing a start oscillator signal on said output terminal of said flip-flop in response to said coincidence signal from said coincidence circuit;
an oscillator circuit comprising an input terminal and an output terminal, said input terminal of said oscillator circuit in electrical communication with said output terminal of said flip-flop, said oscillator circuit generating a periodic timing signal on said output terminal in response to said start oscillator signal from said flip-flop;
a counter comprising a zero terminal, an input terminal and an output terminal, said input terminal of said counter in electrical communication with said output terminal of said oscillator circuit, said counter counting periods of said periodic timing signal from said oscillator circuit;
a stop switch in electrical communication with said reset terminal of said flop-flop for resetting said flip-flop and thereby stopping said oscillator circuit;
a reset switch in electrical communication with said zero terminal of said counter for zeroing said counter; and
a display unit comprising an input terminal in communication with said output terminal of said counter, said display unit providing an indication of distance to the location of lightning in response to the number of periodic timing signals counted by said counter between the occurrence of said coincidence signal and the activation of said stop switch.

15. The lightning detection system of claim 14 wherein said stop switch comprises:
   a microphone circuit comprising an output terminal and producing a thunder detection signal on said output terminal in response to the detection of thunder; and
   a one-shot circuit comprising an input terminal and an output terminal, said input terminal of said one-shot circuit in electrical communication with said output terminal of said microphone circuit, said output terminal of said one-shot circuit in electrical communication with said reset terminal of said flip-flop, said one-shot circuit producing a reset signal on said output terminal of said one-shot circuit in response to said thunder detection signal thereby resetting said flip-flop and stopping said oscillator circuit.

16. The lightning detection system of claim 14 wherein said electro-detection device is an electrostatic detection device producing said second electrical signal on an output terminal of said electrostatic detection device in response to changes in the electrostatic field of the earth caused by lightning.

17. A lightning detection system comprising:
   an optical detection device comprising an output terminal and producing on said output terminal of said optical detection device a first electrical signal in response to the detection of light;
   an electro-detection device comprising an output terminal and producing a second electrical signal on said output terminal of said electro-detection device in response to electrical disturbances caused by lightning;
   a coincidence circuit, comprising a first input terminal, a second input terminal and an output terminal, said first input terminal in electrical communication with said output terminal of said optical detection device and said second input terminal in electrical communication with said output terminal of said electro-detection device, said coincidence circuit producing a coincidence signal on said output terminal of said coincidence circuit in response to approximately simultaneous presence of said first electrical signal and said second electrical signal at said first and second input terminals of said coincidence circuit, respectively;
   a rate determination circuit comprising an input terminal and an output terminal, said input terminal of said rate determination circuit in electrical communication with said output terminal of said coincidence circuit, said rate determination circuit determining the rate of lightning activity in response to a plurality of said coincidence signals from said coincidence circuit and producing on said output terminal of said rate determination circuit a rate signal indicative of said rate of lightning activity; and
   a rate display comprising an input terminal, said input terminal of said rate display in electrical communication with said output terminal of said rate determination circuit for providing a display indicative of said rate of lightning activity in response to said rate signal.

18. The lightning detection system of claim 17 wherein said electro-detection device is an electrostatic detection device producing said second electrical signal on an output terminal of said electrostatic detection device in response to changes in the electrostatic field of the earth caused by lightning.

19. The lightning detection system of claim 17 wherein said rate display comprises an analog meter circuit.

20. The lightning detection system of claim 17 wherein said rate display comprises a bargraph circuit.

* * * * *

UNITED STATES PATENT AND TRADEMARK OFFICE
CERTIFICATE OF CORRECTION

PATENT NO. : 5,396,220
DATED : March 7, 1995
INVENTOR(S) : Ralph J. Markson

It is certified that error appears in the above-indentified patent and that said Letters Patent is hereby corrected as shown below:

Column 6, line 66, "lights 594(a) - 594(c)" should read --lights 596(a) - 596(c)--.

Signed and Sealed this

Fifth Day of December, 1995

*Attest:*

BRUCE LEHMAN

*Attesting Officer*  *Commissioner of Patents and Trademarks*